(12) United States Patent
Kraus et al.

(10) Patent No.: US 7,554,225 B2
(45) Date of Patent: Jun. 30, 2009

(54) ELECTRIC MOTOR WITH A COIL ARRANGEMENT FOR PROVIDING OSCILLATORY LINEAR AND ROTATIONAL MOVEMENT

(75) Inventors: Bernhard Kraus, Braunfels (DE); Hansjörg Reick, Steinbach (DE); Uwe Schober, Glashütten (DE); Alexander Schröter, Steinbach (DE)

(73) Assignee: Braun GmbH, Kronberg (DE)

( * ) Notice: Subject to any disclaimer, the term of this patent is extended or adjusted under 35 U.S.C. 154(b) by 418 days.

(21) Appl. No.: 11/440,876

(22) Filed: May 25, 2006

(65) Prior Publication Data

US 2006/0255665 A1 Nov. 16, 2006

Related U.S. Application Data

(63) Continuation of application No. PCT/EP2004/012522, filed on Nov. 5, 2004.

(30) Foreign Application Priority Data

Nov. 27, 2003 (DE) ................. 103 55 446

(51) Int. Cl.
*H02K 33/16* (2006.01)
(52) U.S. Cl. ............... 310/36; 310/15; 310/30; 310/39; 310/80; 310/154.28; 335/272
(58) Field of Classification Search ........... 310/15, 310/12, 36, 37, 30, 20, 39, 80; 335/272, 335/279; 15/22.1
See application file for complete search history.

(56) References Cited

U.S. PATENT DOCUMENTS 3,525,887 A * 8/1970 D'Ewart, Jr. ............. 310/27

| | | | |
|---|---|---|---|
| 3,863,338 A | 2/1975 | Wellinger et al. | |
| 5,263,218 A | 11/1993 | Giuliani et al. | |
| 5,632,087 A | 5/1997 | Motohashi et al. | |
| 6,377,380 B1 * | 4/2002 | Plesko | 359/198 |
| 7,067,945 B2 * | 6/2006 | Grez et al. | 310/50 |
| 2001/0043016 A1 | 11/2001 | Chun | |
| 2002/0163701 A1 | 11/2002 | Plesko | |
| 2002/0195884 A1 * | 12/2002 | Ichii et al. | 310/15 |
| 2005/0235438 A1 * | 10/2005 | Motohashi et al. | 15/22.1 |
| 2006/0255665 A1 * | 11/2006 | Kraus et al. | 310/36 |

FOREIGN PATENT DOCUMENTS

| | | |
|---|---|---|
| DE | 1 151 307 | 7/1963 |
| DE | 1 463 988 | 7/1969 |
| DE | 1 538 839 | 3/1970 |
| DE | 2 236 276 | 2/1973 |
| EP | 1 193 844 | 3/2004 |
| JP | 2000004575 | 1/2000 |
| WO | WO2004/047670 | 6/2004 |
| WO | WO2004/049547 | 6/2004 |

* cited by examiner

*Primary Examiner*—Karl I Tamai
(74) *Attorney, Agent, or Firm*—Fish & Richardson P.C.

(57) ABSTRACT

An electric motor for a small-scale electrical appliance, such as a toothbrush or shaver. The electric motor includes at least one oscillatory motor component, a magnet arrangement having at least one permanent magnet, and a coil for generating a magnetic field which, in interaction with the magnet arrangement, generates a force for excitation of an oscillatory linear motion. During the interaction between the magnet arrangement and the magnetic field produced by the coil, a torque for excitation of an oscillatory rotational motion is additionally generated.

23 Claims, 4 Drawing Sheets

ELECTRIC MOTOR WITH A COIL ARRANGEMENT FOR PROVIDING OSCILLATORY LINEAR AND ROTATIONAL MOVEMENT

CROSS REFERENCE TO RELATED APPLICATIONS

This application is a continuation of PCT application serial number PCT/EP2004/012522, filed Nov. 5, 2004, which claims priority under 35 U.S.C. §119(a) from German application serial number DE 103 55 446.7, filed Nov. 27, 2003, the entire contents of both of which are hereby incorporated by reference.

TECHNICAL FIELD

This application relates to an electric motor for a small-scale electrical appliance.

BACKGROUND

Electric motors for small-scale electrical appliances have been described in a wide variety of embodiments. For example, Patent No. DE 1 151 307 A discloses an oscillating armature drive for dry shaving apparatus, which has a shaving cutter with a reciprocating working motion, and which has a U-shaped electromagnet formed fast with the housing of the shaving apparatus. A working armature and a compensating armature, on either side of the working armature, are arranged for oscillation in close proximity to the poles of the electromagnet. In the operating mode, the working armature, which drives a shaving cutter, oscillates in parallel with the pole faces of the electromagnet, and the compensating armatures perform an oscillatory motion in phase opposition thereto in order to prevent, as far as possible, the oscillations of the working armature being transferred onto the housing of the shaving apparatus.

U.S. Pat. No. 5,632,087 further discloses a dry shaver with a linear motor. The linear motor has a stator coil and several rotors equipped with permanent magnets, which are excited into a state of linear oscillation by the stator coil. The displacements of the rotors are detected by means of detectors associated with the rotors, and are further processed in the form of an average value. In the process, the supply of current to the stator coil is controlled as a function of the average value, in such a way that the oscillation amplitudes of all rotors are maintained as constant as possible. The detectors each have one permanent magnet, which is positioned on the respective rotor, and one positionally fixed sensor coil in which an induction voltage dependent on the velocity of the respective rotor is generated as a result of the effect of the permanent magnet.

Patent No. EP 1 193 844 A1 discloses a linear oscillator in which a housing constructed as a stator accommodates a rotor that executes a reciprocating motion. Also movably arranged in the housing is a spindle for controlling the oscillation amplitude of the rotor. The rotor and the spindle are coupled to each other, and to the housing, by means of springs. The coupling of the rotor with the housing can be performed by means of a helical spring having its one end secured to the housing and its other end secured to the rotor. In this arrangement, the spring not only exerts a force in axial direction during compression and extension, but also slightly rotates the rotor each time, so that an oscillatory rotational motion is generated, in particular if the excitation takes place with the resonant frequency of the oscillatory rotational motion.

With these arrangements, initially only linear oscillation is generated. In Patent No. EP 1 193 844 A1, there is disclosed the possibility of additionally generating an oscillatory rotational motion from the oscillatory linear motion by means of a spring. However, the oscillatory rotational motion generated in this way is coupled to the oscillatory linear motion and necessarily requires excitation of the oscillatory linear motion. Furthermore, the oscillatory rotational motion invariably has the same frequency as the oscillatory linear motion, so that the variation possibilities are very limited.

SUMMARY

In one aspect of the present invention, an electric motor for a small-scale electrical appliance has at least one oscillatory motor component and a magnet arrangement having at least one permanent magnet. The electric motor further has a coil for generating a magnetic field which, in interaction with the magnet arrangement, generates a force for excitation of an oscillatory linear motion. During the interaction between the magnet arrangement and the magnetic field produced by the coil, a torque for excitation of an oscillatory rotational motion is additionally generated. Each of the motions can be generated separately in isolation from the other motions.

Certain embodiments may provide one or more of the following advantages. The electric motor has a very simple design. Both a linear and a rotary oscillation are generated by the same motor, hence obviating the need for a gearing, and comparatively high frequencies of oscillation are achievable, while only low levels of housing vibrations are generated. The electric motor operates very quietly.

The oscillatory linear motion can be orientated parallel and/or perpendicular to the axis of rotation of the oscillatory rotational motion. There are a large number of applications for such a motion pattern.

In some embodiments, the electric motor may be designed in such a way that the same motor component performs a plurality of different oscillatory motions. In other embodiments, a plurality of motor components can each perform at least one oscillatory motion. In this arrangement, the motor components can perform different oscillatory motions. For example, one motor component may perform a linear oscillation and another motor component may perform a rotational oscillation.

In some embodiments, each of one set of permanent magnets excites one type of oscillatory motion. In this embodiment, a plurality of functional segments may be arranged axially side-by-side, with every functional segment each having one set of permanent magnets. For example, at least one outer functional segment arranged in an axial end area may be provided with one set of permanent magnets for excitation of an oscillatory linear motion. Furthermore, at least one inner functional segment arranged axially between two outer functional segments may be provided with one set of permanent magnets for excitation of an oscillatory rotational motion.

In some embodiments, a rotor and a stator can be provided as oscillatory motor components. In this embodiment, the stator is not positionally fixed, being instead movably mounted like the rotor. The oscillatory motor components are capable of executing oscillatory motions in phase opposition to each other thus housing vibrations can be kept very low. Similarly, at least one balancing weight can be provided which is coupled by means of at least one elastic element to an oscillatory motor component. As a result, a suppression of housing vibrations can be achieved because the balancing weight oscillates in phase opposition to the associated oscillatory motor component. In some embodiments, a plurality of oscillatory motor components can be provided with different resonant frequencies. This enables individual control of the individual oscillatory motor components, even though only a single coil is provided for excitation of the oscillatory motor components. The motion of at least one oscillatory motor component can be tapped by means of an elastic element, making it is possible to accomplish a reduction or increase in ratio of the oscillatory motion without a mechanical gearing.

In order to bring the magnetic field produced by the coil into interaction with the magnet arrangement, a magnetizable material can be provided within at least part of the coil for temporary magnetization by means of the magnetic field of the coil.

The present disclosure relates further to a small-scale electrical appliance which is equipped with the electric motor. The small-scale appliance may be constructed, for example, as an electric toothbrush or as an electric shaving apparatus.

Another aspect of the disclosure relates to a method of operating an electric motor having at least one oscillatory motor component, a magnet arrangement including at least one permanent magnet, and a coil for generation of a magnetic field which, interacting with the magnet arrangement, generates a force for excitation of an oscillatory linear motion. The method includes by virtue of the interaction of the magnetic field produced by the coil with the magnet arrangement, a torque is additionally generated for excitation of an oscillatory rotational motion.

In some embodiments of the method, the oscillatory motor components may be excited into oscillations having different frequencies and/or different amplitudes, so that a broad range of motion states can be generated.

Other aspects, features, and advantages will be apparent from the following detailed description, the drawings, and the claims which relate to the use of the electric motor in an electric toothbrush.

DETAILED DESCRIPTION

Figure 1:
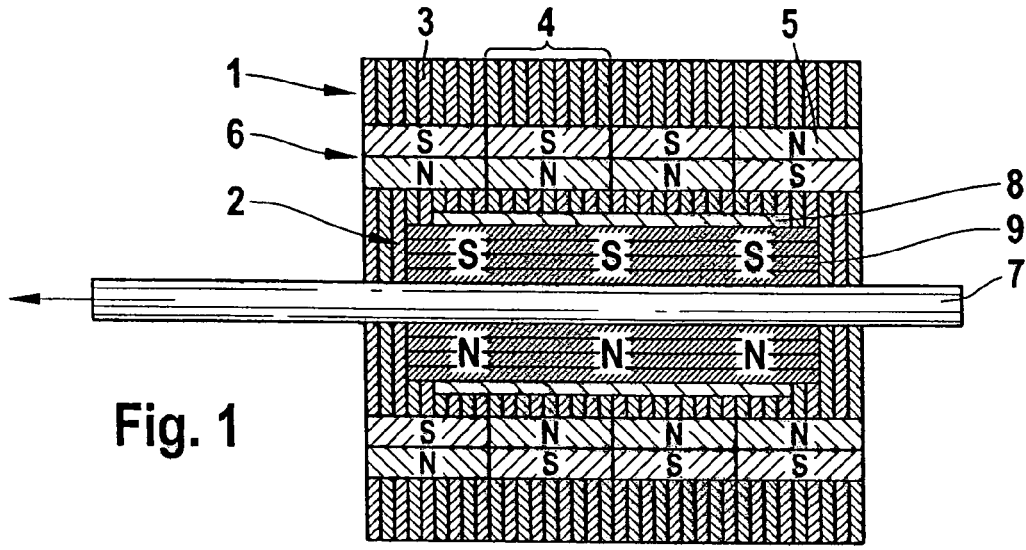
FIG. 1 is a schematic diagram of an embodiment of the electric motor.

Referring to FIG. 1, the electric motor has a stator 1 and a rotor 2 which is rotatable relative to the stator 1 and displaceable parallel to the axis of rotation. The stator 1 is has a stack of soft iron sheets 3 forming four segments 4 in an axial side-by-side arrangement. Each segment 4 has one set comprising a plurality of permanent magnets 5 which are distributed around the circumference of the stator 1 and combine to form a magnet arrangement 6 of the stator 1. The rotor 2 has an iron core 8 arranged on a shaft 7 and a coil 9 and is capable of performing both linear and rotary oscillations relative to the stator 1. A current signal is supplied to the coil 9 in order to excite these oscillations. By virtue of the current flow through the coil 9, a magnetic field develops particularly in the area of the iron core 8, causing the iron core 8 to be temporarily magnetized. The magnetic interaction between the magnetized iron core 8 and the permanent magnets 5 results in forces and torques, the directions of which depend on the arrangement of the permanent magnets 5 relative to the magnetized iron core 8. In some embodiments, the interactions between the magnetized iron core 8 and the permanent magnets 5 of both of the inner segments 4 of the stator 1 each generate a torque in the same direction, and the interactions between the magnetized iron core 8 and the permanent magnets 5 of both of the outer segments 4 each generate a force in axial direction. Due to the effects of these torques and forces, the rotor 2 is driven both rotationally and in an axial direction. Details of the generation of these drive motions are explained with reference to FIGS. 2 and 3.

Figure 2:
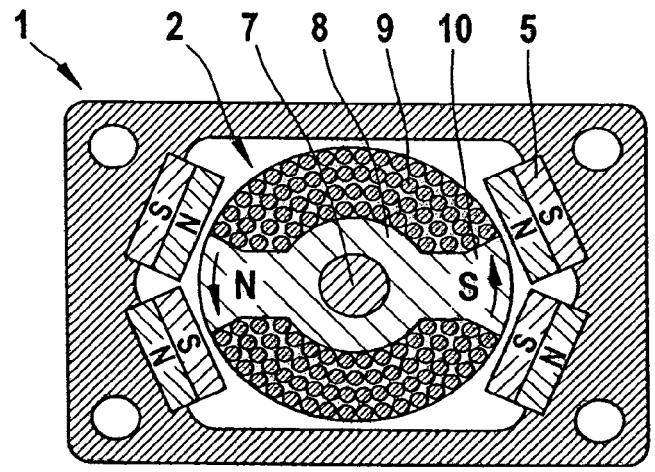
FIG. 2 is a schematic cross-sectional view of the embodiment of the electric motor shown in FIG. 1, the section being taken through one of the inner segments of the stator.

FIG. 2, shows the embodiment of the electric motor illustrated in FIG. 1 in a schematic cross-sectional representation, the section being taken through one of the inner segments 4 of the stator 1. As becomes apparent from FIG. 2, the iron core 8 has two radial projections 10, which are diametrically opposed to each other and which are in the area where magnetic poles are formed by virtue of the temporary magnetization of the iron core 8. The permanent magnets 5 which are attached to the inner segments 4 of the stator 1 are arranged radially adjacent to the radial projections 10 of the iron core 8. In this arrangement, two permanent magnets 5 are each positioned with reversed polarity next to each other in circumferential direction. The positioning of the permanent magnets 5 in relation to the neighboring radial projection 10 of the iron core 8 is identical for both radial projections 10, so that the permanent magnets 5 are arranged in a mirrored layout in relation to the median plane extending between the two radial projections 10.

FIG. 2 represents a snap-shot of the formation of the magnetic field of the coil 9 and therefore of the magnetization of the iron core 8, as well as of the rotational position of the rotor 2 relative to the stator 1. At the time of the snap-shot, the attractive effect between unlike poles of the permanent magnets 5 and the magnetized iron core 8, and the repulsive effect between like poles produces a resultant torque, which drives the rotor 2 in a counter-clockwise direction relative to the stator 1. If the direction of current flow through the coil 9 is reversed, then the polarity of the magnetic field of the coil 9, and therefore also the magnetization of the iron core 8, are reversed. As a consequence, a resultant torque is generated in the opposite direction which drives the rotor 2 in a clockwise direction relative to the stator 1. If the current flow through the coil 9 is continuously reversed, the direction of rotation of the rotor 2 is also continuously reversed, so that the rotor 2 performs an oscillatory rotational motion relative to the stator 1. As becomes apparent from FIG. 1, the axially neighboring permanent magnets 5 of the two inner segments 4 of the stator 1 have the same orientation. Considering furthermore that the magnetization of the iron core 8 in the area of the two inner segments 4 of the stator 1 does not vary significantly in an axial direction, the interaction between the magnetized iron core 8 and the permanent magnets 5 of the two inner segments 4 generates no force in an axial direction. This means that the arrangement of the permanent magnets 5 of the two inner segments 4 of the stator 1 shown in FIGS. 1 and 2 enables a directionalized rotational excitation of the rotor 2.

Figure 3:
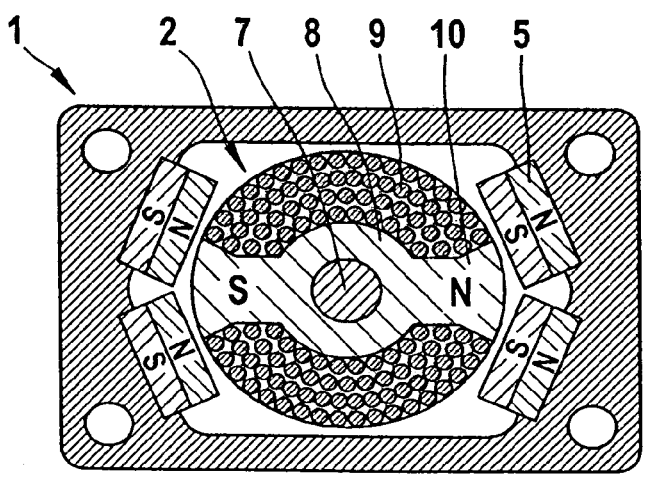
FIG. 3 is a schematic cross-sectional view of the embodiment of the electric motor shown in FIG. 1, the section being taken through one of the outer segments of the stator.

FIG. 3 shows the embodiment of the electric motor illustrated in FIG. 1 in a schematic cross-sectional representation, the section being taken through one of the outer segments 4 of the stator 1. The representation is a snap-shot of the same instant of time as the one shown in FIG. 2. In contrast to the inner segments 4 of the stator 1, two permanent magnets 5 with the same polarity are each arranged adjacent to each other in a circumferential direction in the two outer segments 4 in the area of the radial projections 10 of the iron core 8. As a result of this arrangement, the interaction between the magnetized iron core 8 and the permanent magnets 5 of the two outer segments 4 of the stator 1 produces no resultant torque. Furthermore, the permanent magnets 5 are arranged with opposite polarity in diametrically opposed circumferential areas, so that the radial forces acting upon the rotor 2 mutually cancel each other out. As becomes apparent from FIG. 1, the mutually corresponding permanent magnets 5 of the two outer segments 4 of the stator 1 are each arranged with opposite polarity to each other. At the instant of time shown in FIG. 1, this results in an attractive effect between the magnetized iron core 8 and the permanent magnets 5 of the left-hand segment 4, and in a repulsive effect between the magnetized iron core 8 and the permanent magnets 5 of the right-hand segment 4. The attendant axial forces produce an axial movement of the rotor 2 relative to the stator 1 which is directed to the left. A reversal of the current flow through the coil 9 causes a reversal of the polarity of the magnetized iron core 8, and therefore a reversal of the direction of motion of the rotor 2. The two outer segments 4 of the stator 1 thus enable a directionalized excitation of an axial oscillatory motion.

In addition to the axial oscillatory motion, it is also possible to generate a radial oscillatory motion of the rotor 2. To accomplish this, a yet different arrangement of the permanent magnets 5 is required. One embodiment of an arrangement of the permanent magnets 5 for generation of a radial oscillatory motion is shown in FIG. 4.

Figure 4:
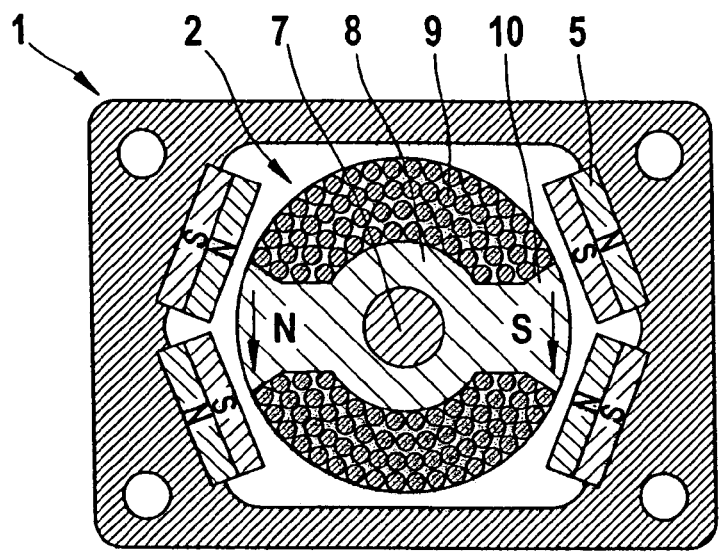
FIG. 4 is a schematic cross-sectional view of another embodiment of the electric motor.

FIG. 4 shows a further embodiment of the electric motor in a schematic cross-sectional representation. In this Figure, the section is taken through a segment 4 of the stator 1, said segment 4 serving to generate a radial oscillatory motion. In some embodiments, segments 4 formed in this way can be substituted for the outer segments 4 of the embodiment shown in FIG. 1, so that the electric motor is capable of generating an oscillatory rotational motion and an oscillatory linear motion in a radial direction. In other embodiments, on one or more of these segments 4 can be added to the embodiment of the electric motor shown in FIG. 1. An electric motor formed in this way can generate an oscillatory rotational motion and an oscillatory linear motion in both axial and radial directions.

The segment 4 of the stator 1 shown in FIG. 4 has the permanent magnets 5 arranged with opposite polarity adjacent to each other in a circumferential direction in the area of the radial projections 10 of the iron core 8, with the permanent magnets 5 being of opposite polarity in the area of both radial projections 10. As the two radial projections 10 of the iron core 8 represent magnetic poles of opposite polarity, magnetic forces are exerted in the same direction by the permanent magnets 5 on the two radial projections 10. The resultant force causes a motion of the rotor 2 in a radial direction. At the instant of time shown in FIG. 4, this motion is directed vertically downward. If the direction of the current flow through the coil 9 is changed, then the direction of motion is reversed, resulting in a vertical upward motion in the representation shown in FIG. 4.

Embodiments of the electric motor are capable of performing oscillatory motions in a plurality of directions. As described in the foregoing, this requires corresponding excitation of the desired oscillatory motions. Furthermore, an oscillatory system must also be present. The electric motor is therefore constructed as a spring-mass system which is tuned to the desired oscillatory motions. This will be explained in more detail below with reference to FIGS. 5 to 10.

Figure 5:
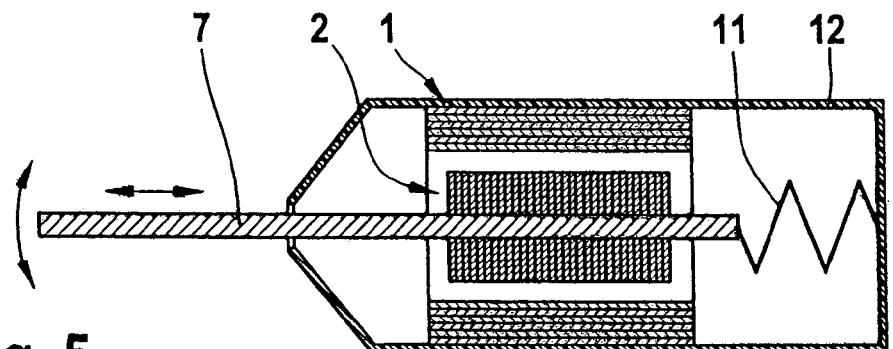
FIG. 5 is a schematic representation of a possible configuration of the spring-mass system for some embodiments of the electric motor shown in FIGS. 1, 2 and 3.

FIG. 5 shows a schematic representation of an implementation of the spring-mass system for some embodiments of the electric motor shown in FIGS. 1, 2 and 3. The rotor 2 represents an oscillatory mass which is coupled by means of a spring 11 with a housing 12 to which the stator 1 is attached. The spring 11 can be constructed as a helical spring, thus acting both as a linear spring element as well as a torsion spring element. Accordingly, the rotor 2 is able to perform both an oscillatory linear motion in an axial direction, and an oscillatory rotational motion. The resonant frequency of the relevant mode of oscillation depends upon the mass of the rotor 2, and the linear spring constant of the spring 11, or on the moment of inertia of the rotor 2, and the rotational spring constant of the spring 11. The selected dimensions are such that the resonant frequencies are different for the two modes of oscillation of the rotor 2. This makes it possible to individually control the two modes of oscillation. To accomplish this, a current signal can be supplied to the coil 9, the frequency of which lies between the resonant frequencies for the two modes of oscillation in order to excite both modes of oscillation. In some embodiments, one mode of oscillation can be excited if the frequency of the current signal coincides with the resonant frequency for this particular mode of oscillation. In other embodiments, the two modes of oscillation with different frequencies can be excited by supplying a current signal to the coil 9, such that the current signal has a plurality of frequency components each of which correspond to a resonant frequency. By weighting the individual frequency components, the different modes of oscillation can be excited to different levels. The separate excitation of the individual modes of oscillation is slightly disturbed when a shared spring 11 is used for both modes of oscillation, as the spring 11 causes the oscillatory linear motion to be converted to a small degree into an oscillatory rotational motion, and vice versa. However, the main contribution to the generation of the oscillatory linear motion, and to the oscillatory rotational motion comes from the magnetic interaction, as described with reference to FIGS. 1, 2, and 3 between the magnetized iron core 8 of the rotor 2 and the permanent magnets 5 of the relevant segment 4 of the stator 1.

Figure 6:
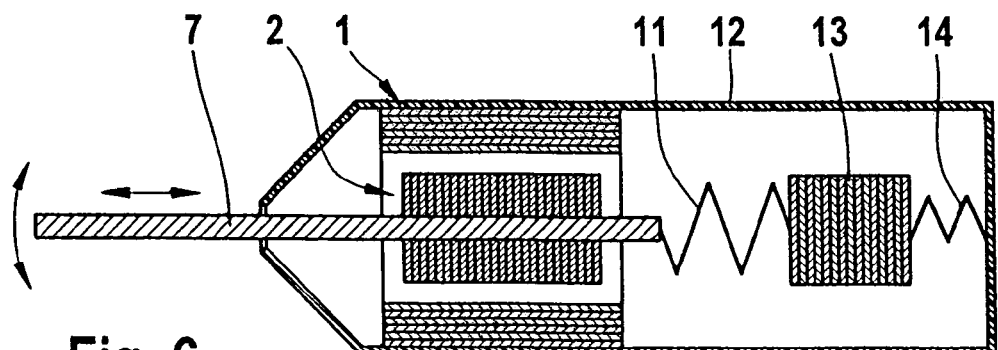
FIG. 6 is a schematic representation of an embodiment of the spring-mass system.

FIG. 6 shows a schematic representation of a modification, in some embodiments, of the spring-mass system. In comparison to the configuration of the spring-mass system shown in FIG. 5, an additional balancing weight 13 and a spring 14 are provided. The additional balancing weight 13 and the spring 14 are connected to each other and are arranged between the spring 11 and the housing 12. The balancing weight 13 serves to reduce vibrations of the housing 12, and oscillates in phase opposition to the rotor 2. The spring 14 is designed significantly weaker than spring 11 in order to keep the transmission of oscillatory motion onto the housing 12 as low as possible. In other embodiments, a third spring can be inserted between the shaft 7 and the housing 1. Given an appropriate design of the springs, no vibrations are transferred to the housing if the oscillations of the shaft 7 and the mass 13 are opposed to each other.

Figure 7:
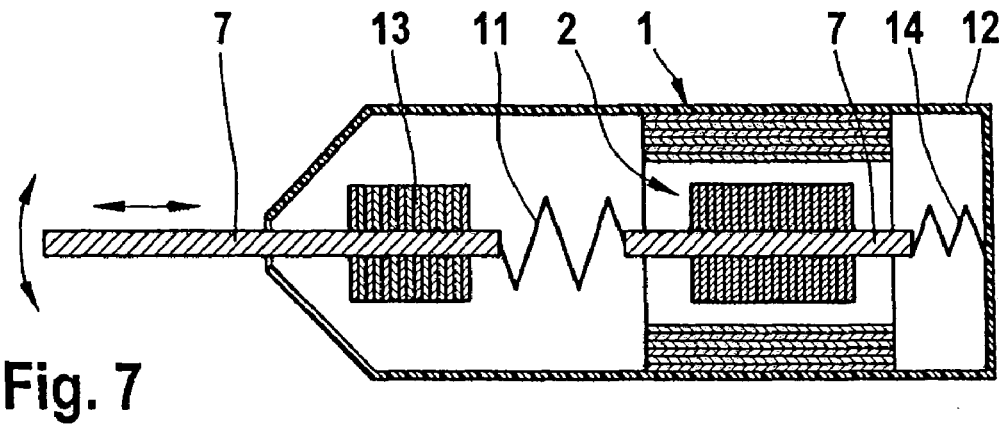
FIG. 7 is a schematic representation of a further embodiment of the spring-mass system.

In some embodiments, the spring mass system can be modified as shown in FIG. 7. In this configuration of the spring-mass system, the shaft 7 is split axially, with the two parts of the shaft 7 being coupled by means of the spring 11. The balancing weight 13 is arranged on the part of the shaft 7 shown on the left in the representation of FIG. 7, which serves to receive a push-on toothbrush not shown in the Figure. The other part of the shaft 7 forms part of the rotor 2 and is mounted on the housing 12 by means of the spring 14. The two parts of the shaft 7 execute linear and rotational oscillations in phase opposition to each other. In the process, the oscillation amplitudes of the two parts of the shaft 7 behave inversely to each other in the same way as the associated masses or moments of inertia. In this way it is possible to obtain a reduction or increase in ratio of the drive motion generated with the electric motor of the invention without the need to provide a mechanical gearing.

Figure 8:
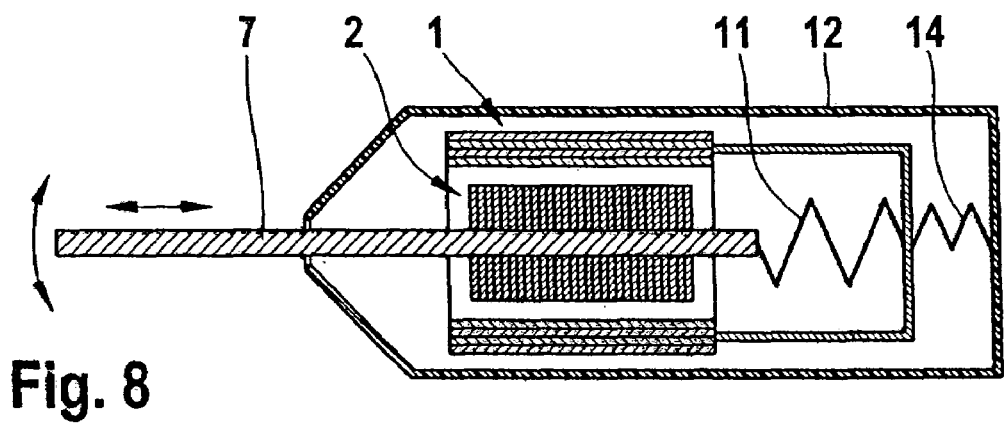
FIG. 8 is schematic representation of a further embodiment of the spring-mass system.

In some embodiments, the spring mass system can be modified as shown in FIG. 8. In this modification, the stator 1 is not formed fast with the housing 12, but instead the stator 1 is elastically mounted on the housing 12 by means of the spring 14, and is thus movable. The stator 1 and the rotor 2 are coupled to each other by means of the spring 11. The consequence of this geometry is that the stator 1 oscillates in phase opposition to the rotor 2, as a result of which the generation of housing vibrations can be largely suppressed even without a balancing weight 13. The motion of the stator 1 can be utilized for the purpose of providing a drive. The modes of oscillation performed by the electric motor can be divided in different ways onto the stator 1 and the rotor 2. This will be explained by way of example with reference to FIGS. 9 and 10.

Figure 9:
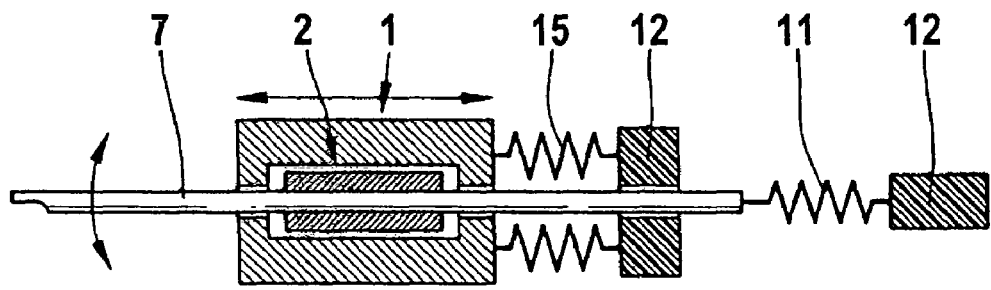
FIG. 9 is a schematic representation of a further embodiment of the spring-mass system.

FIG. 9 shows a schematic representation of a further embodiment of the spring-mass system. In this embodiment, the rotor 2 performs an oscillatory rotational motion and, depending on the mounting of the shaft 7, also an oscillatory linear motion in an axial direction. The stator 1 executes an oscillatory linear motion in an axial direction. In order to enable these oscillations, the stator 1 is mounted with a plurality of springs 15 on the housing 12, which in FIG. 9 is only indicated symbolically in each of the mounting point areas. By using a plurality of springs 15, any significant rotational deflection of the stator 1 is prevented from occurring. By contrast, the springs 15 assist an oscillatory linear motion of the stator 1 in an axial direction. The shaft 7 of the rotor 2 is mounted on the housing 12 by means of the spring 11, which may be designed such as to assist both rotational and linear oscillations in an axial direction. In a further aspect, the shaft 7 is held in an axial direction, as a result of which no axial oscillatory motion of the rotor 2 is possible. In this case the rotor 2 exclusively performs an oscillatory rotational motion, enabling an oscillatory rotational motion to be tapped at the rotor 2, and an oscillatory linear motion in an axial direction at the stator 1. In other embodiments of the spring-mass system shown in FIG. 9, the springs 11 and/or 15 are not each fixed on the housing 12, but on a movable balancing weight 13 instead.

Figure 10:
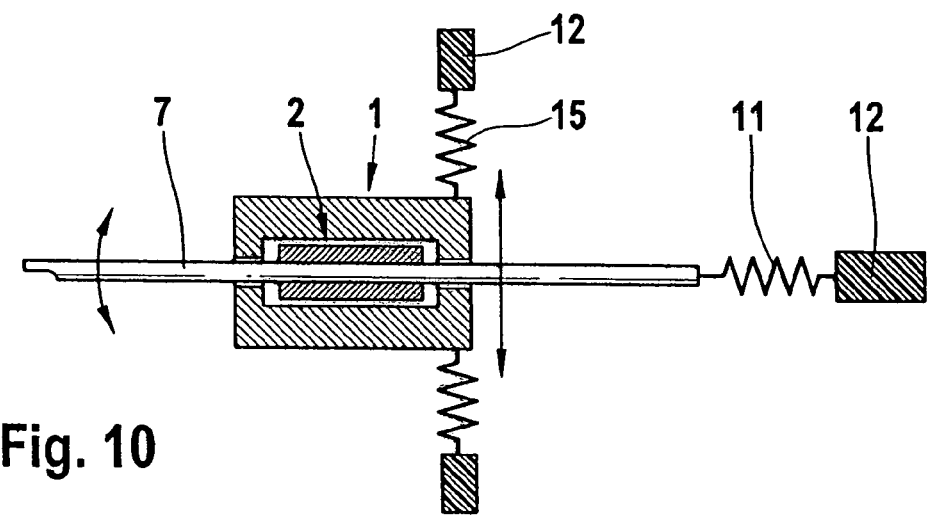
FIG. 10 is a schematic representation of a further embodiment of the spring-mass system.

FIG. 10 shows a schematic representation of an embodiment of the spring-mass in which the rotor 2 performs a rotational oscillation. If the shaft 7 of the rotor 2 is not held radially, the rotor 2 additionally performs a linear oscillation in a radial direction. The rotor 2 is elastically mounted on the housing 12 by means of the spring 11 which supports at least rotational oscillation. The stator 1 is mounted elastically in a radial direction on the housing 12 by means of the springs 15 which largely prevent a rotational motion of the stator 1. The spring-mass system of FIG. 10 can be operated with segments 4 of the stator 1 for rotational excitation and a linear excitation in a radial direction. If the shaft 7 is held radially, then an oscillatory rotational motion is available at the shaft 7 and an oscillatory linear motion in a radial direction is available at the stator 1 for driving the electrical appliance.

Figure 11:
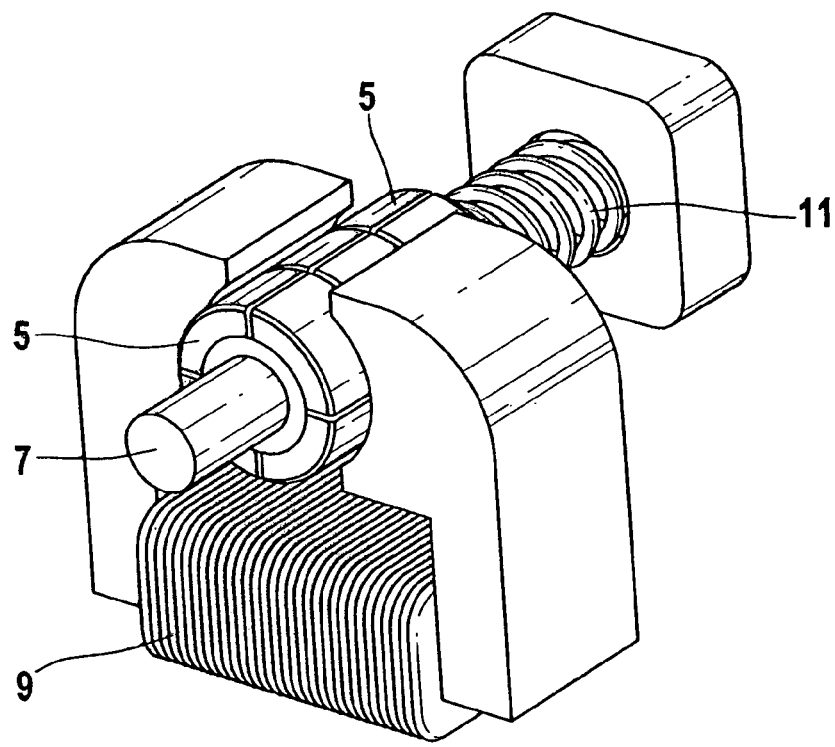
FIG. 11 is a view of a further embodiment.

In some embodiments, the permanent magnets 5 can form part of the rotor 2, and the coil 9 can form part of the stator 1, as shown in FIG. 11. The architecture may correspond to that of electronically commutated DC motors. The difference lies in the arrangement of the magnet(s). A plurality of permanent magnets 5—as indicated in FIG. 11—may be involved, or a single magnet can be used which is magnetized at a corresponding "slant". In other embodiments, if a magnet is used which is magnetized in the conventional straight fashion, the armature core disks can be positioned at a slant. In some embodiments, the permanent magnets 5 and the coil 9 together can be arranged on the stator 1 or on the rotor 2. In other embodiments, a plurality of single coils, which are driven jointly, can be interconnected to provide the coil 9. A plurality of electrically interconnected single coils is treated as a joint coil 9.

The embodiments of the electric motor shown in the Figures can be used in an electric toothbrush, with the different modes of oscillation enabling different brushing motions to be performed. However, the electric motor can also be used in other small-scale electrical appliances, such as in an electric shaving apparatus. The layout of the electric motor may vary depending on the intended application.

There are other embodiments within the scope of the following claims.

What is claimed is:

1. An electric motor for a small-scale electrical appliance comprising:
    at least one oscillatory motor component;
    a magnet arrangement having a first segment and a second segment, each of which includes at least one permanent magnet; and
    a coil arranged to generate a magnetic field that interacts with the first segment to generate a force for excitation of an oscillatory linear motion, and that interacts with the second segment to generate a torque for excitation of an oscillatory rotational motion in addition to the linear motion.

2. The electric motor according to claim 1, wherein the oscillatory rotational motion defines a rotational axis that is parallel to the oscillatory linear motion.

3. The electric motor according to claim 1 wherein the oscillatory rotational motion defines a rotational axis that is perpendicular to the oscillatory linear motion.

4. The electric motor according to claim 1, wherein the oscillatory motor component performs a plurality of different oscillatory motions.

5. The electric motor according to claim 1, further comprising a plurality of motor components, each performing at least one oscillatory motion.

6. The electric motor according to claim 5, wherein the oscillatory motor components execute oscillatory motions in phase opposition to each other.

7. The electric motor according to claim 5, wherein the motor components perform different oscillatory motions.

8. The electric motor according to claim 7, wherein one motorcomponent performs a linear oscillation, and another motor component performs a rotational oscillation.

9. The electric motor according to claim 1, wherein each of one set of permanent magnets excites one type of oscillatory motion.

10. The electric motor according to claim 1, further comprising a plurality of functional segments arranged axially side-by-side, with each functional segment having one set of permanent magnets.

11. The electric motor according to claim 10, wherein at least one outer functional segment arranged in an axial end area includes one set of permanent magnets for excitation of an oscillatory linear motion.

12. The electric motor according to claim 11, wherein at least one inner functional segment arranged axially between two outer functional segments includes one set of permanent magnets for excitation of an oscillatory rotational motion.

13. The electric motor according to claim 1, further comprising a rotor and a stator constructed as oscillatory motor components.

14. The electric motor according to claim 1, further comprising an elastic element; and at least one balancing weight coupled by the elastic element to the oscillatory motor component.

15. The electric motor according to claim 14, wherein the balancing weight oscillates in phase opposition to the oscillatory motor component.

16. The electric motor according to claim 1, further comprising a plurality of oscillatory motor components with different resonant frequencies.

17. The electric motor according to claim 1, further comprising an elastic element configured to tap the motion the oscillatory motor component.

18. The electric motor according to claim 1, further comprising a magnetizable material within at least part of the coil and configured to be temporarily magnetized by the magnetic field of the coil.

19. A small-scale electrical appliance comprising a housing and the electric motor of claim 1 disposed within the housing.

20. The small-scale electrical appliance according to claim 19, constructed as an electric toothbrush.

21. The small-scale electrical appliance according to claim 19, constructed as an electric shaving apparatus.

22. A method of operating an electric motor having at least one oscillatory motor component, the method comprising:
generating a force for excitation of an oscillatory linear motion of a motor component by inducing a magnetic field in a coil, the magnetic field interacting with a first segment of a magnet arrangement, the first segment having at least one permanent magnet; and
generating a torque for excitation of an oscillatory rotational motion through interaction of the magnetic field and a second segment of the magnet arrangement, the second segment having at least one permanent magnet.

23. The method according to claim 22, wherein different oscillatory motor components are excited into oscillations having different frequencies and/or amplitudes.

* * * * *

UNITED STATES PATENT AND TRADEMARK OFFICE
CERTIFICATE OF CORRECTION

| | | |
|---|---|---|
| PATENT NO. | : 7,554,225 B2 | Page 1 of 1 |
| APPLICATION NO. | : 11/440876 | |
| DATED | : June 30, 2009 | |
| INVENTOR(S) | : Bernhard Kraus et al. | |

It is certified that error appears in the above-identified patent and that said Letters Patent is hereby corrected as shown below:

Column 8, Claim 8, Line 63;

Delete "motorcomponent" and Insert --motor component--

Signed and Sealed this

Twenty-fifth Day of August, 2009

David J. Kappos
*Director of the United States Patent and Trademark Office*